US009586691B2

(12) United States Patent
Rossotto et al.

(10) Patent No.: US 9,586,691 B2
(45) Date of Patent: Mar. 7, 2017

(54) REGULATED THREE-ENGINED POWER PLANT FOR A ROTARY WING AIRCRAFT

(71) Applicant: AIRBUS HELICOPTERS, Marignane (FR)

(72) Inventors: Regis Rossotto, Marseilles (FR); Hanno Boie, Marseilles (FR)

(73) Assignee: Airbus Helicopters, Marignane (FR)

( * ) Notice: Subject to any disclaimer, the term of this patent is extended or adjusted under 35 U.S.C. 154(b) by 166 days.

(21) Appl. No.: 14/333,765

(22) Filed: Jul. 17, 2014

(65) Prior Publication Data
US 2015/0028153 A1 Jan. 29, 2015

(30) Foreign Application Priority Data

Jul. 23, 2013 (FR) ..................................... 13 01749

(51) Int. Cl.
*B64D 31/06* (2006.01)
*B64C 27/00* (2006.01)
(Continued)

(52) U.S. Cl.
CPC .............. *B64D 31/06* (2013.01); *B64C 27/00* (2013.01); *B64C 27/12* (2013.01); *B64D 35/08* (2013.01);
(Continued)

(58) Field of Classification Search
CPC ........ B64D 31/06; B64D 35/08; B64C 27/00; B64C 27/12; F02C 9/42; F05D 2220/329;
(Continued)

(56) References Cited

U.S. PATENT DOCUMENTS 3,174,551 A    3/1965    McCarthy
3,963,372 A    6/1976    McLain et al.
(Continued)

FOREIGN PATENT DOCUMENTS

FR             2847858 A1 *   6/2004   ............. B60K 6/365
FR    WO 2010116104 A1 *   10/2010   ............... B60K 1/00
(Continued)

OTHER PUBLICATIONS

French Search Report for FR 1301749, Completed by the French Patent Office on Apr. 2, 2014, 6 Pages.

*Primary Examiner* — Tuan C. To
(74) *Attorney, Agent, or Firm* — Brooks Kushman P.C.

(57) ABSTRACT

A power plant (1) having two engine groups (10, 20) and a main gearbox (MGB) (2), and a rotary wing aircraft (30) having such a power plant (1). Each engine group (10, 20) drives said MGB (2) mechanically to rotate a main outlet shaft (3) and, consequently, a main rotor (31) of said aircraft (30) at a frequency of rotation NR. A first engine group (10) has two main engines (11, 12) and is by a first setpoint NR* for said frequency of rotation NR, while a second engine group (20) has one secondary engine (21) and is regulated by a second setpoint $W_1^*$ for power from said second engine group (20). The first engine group (10) is also regulated by a third setpoint $W_2f^*$ for anticipating power such that said first engine group (10) and said second engine group (20) deliver the power needed at said main rotor (31).

13 Claims, 2 Drawing Sheets

(51) Int. Cl.
   *B64C 27/12*   (2006.01)
   *B64D 35/08*   (2006.01)
   *F02C 9/42*    (2006.01)

(52) U.S. Cl.
   CPC .......... *F02C 9/42* (2013.01); *F05D 2220/329* (2013.01); *F05D 2270/05* (2013.01); *F05D 2270/053* (2013.01); *Y02T 50/671* (2013.01)

(58) Field of Classification Search
   CPC .......... F05D 2270/05; F05D 2270/053; Y02T 50/671
   See application file for complete search history.

(56) References Cited

U.S. PATENT DOCUMENTS

| | | | | |
|---|---|---|---|---|
| 4,302,815 A * | 11/1981 | Tedeschi | ............... | F02B 77/083 123/682 |
| 4,458,471 A * | 7/1984 | Herwig | ............... | A01D 41/1274 460/6 |
| 4,479,619 A | 10/1984 | Saunders et al. | | |
| 4,522,025 A | 6/1985 | Greune et al. | | |
| 6,089,018 A * | 7/2000 | Bischoff | ................. | F02B 37/24 60/602 |
| 6,202,414 B1 * | 3/2001 | Schmidt | ............... | F02B 37/007 60/605.2 |
| 8,442,740 B2 | 5/2013 | Rossotto | | |
| 2003/0135305 A1 | 7/2003 | Zagranski et al. | | |
| 2005/0262825 A1 * | 12/2005 | Certain | ................... | F02C 9/28 60/39.281 |
| 2007/0272207 A1 * | 11/2007 | Claudepierre | ........ | F02D 31/001 123/339.19 |
| 2010/0018182 A1 * | 1/2010 | Bader | .................... | F02C 7/236 60/39.281 |
| 2010/0151990 A1 * | 6/2010 | Seel | ........................ | B60K 6/48 477/5 |
| 2013/0199198 A1 * | 8/2013 | Corpron | .................. | F01D 5/12 60/773 |
| 2013/0219905 A1 | 8/2013 | Marconi et al. | | |
| 2013/0265012 A1 * | 10/2013 | Kaefer | ................. | B60W 10/06 320/138 |
| 2013/0291549 A1 * | 11/2013 | Martin | ..................... | F02C 9/00 60/773 |
| 2014/0008988 A1 * | 1/2014 | Clarke | ..................... | H02J 3/40 307/84 |
| 2014/0145028 A1 * | 5/2014 | Gomez | .................. | B64C 27/12 244/58 |
| 2014/0203788 A1 * | 7/2014 | Andrejak | ................. | H02P 9/04 322/14 |
| 2015/0125258 A1 * | 5/2015 | Certain | ................. | B64D 35/08 415/1 |

FOREIGN PATENT DOCUMENTS

| | | | | |
|---|---|---|---|---|
| FR | 2974564 | | 11/2012 | |
| JP | EP 2098745 A1 * | | 9/2009 | ............. F16D 48/06 |
| WO | 2012059671 | | 5/2012 | |

* cited by examiner

Fig.3

REGULATED THREE-ENGINED POWER PLANT FOR A ROTARY WING AIRCRAFT

CROSS REFERENCE TO RELATED APPLICATION

This application claims priority to French patent application No. FR 13 01749 filed on Jul. 23, 2013, the disclosure of which is incorporated in its entirety by reference herein.

BACKGROUND OF THE INVENTION (1) Field of the Invention

The present invention lies in the field of powering rotary wing aircraft having a plurality of engines, and it lies more particularly in the field of regulating such a power plant.

The present invention relates to a power plant for a rotary wing aircraft and to a rotary wing aircraft having such a power plant, and it also relates to a method of regulating such a power plant. The invention is particularly intended for regulating a power plant having three engines.

(2) Description of Related Art

A power plant for a rotary wing aircraft generally has one or two engines and a main gearbox (MGB). Each engine drives the MGB mechanically in order to rotate at least one main outlet shaft of the MGB. The outlet shaft is constrained to rotate with a main rotor of the rotary wing aircraft in order to provide the aircraft with lift, and possibly also with propulsion.

The MGB generally has secondary outlet shafts, e.g. for driving rotation of a tail rotor or indeed of one or two propulsion propellers via an auxiliary gearbox and for driving an electricity generator and/or hydraulic systems. The respective frequencies of rotation of such secondary outlet shafts are generally different from the frequency of rotation of the main outlet shaft.

It should be understood that the term "engine" is used to designate an engine unit serving to drive said MGB mechanically, and consequently contributing to providing the rotary wing aircraft with lift and/or propulsion. Such engines may for example be turboshaft engines on board rotary wing aircraft.

Furthermore, it is nowadays common practice to use a two-engined power plant on board rotary wing aircraft, each engine being controlled by a dedicated computer. Such engines are generally identical turboshaft engines operating in application of regulation rules.

For example, regulation may be proportional, thereby enabling the system to be regulated in proportion to a difference between a current value of the system that is to be regulated and a setpoint value. Such regulation is generally effective. However the setpoint value is never reached when using proportional regulation, since there is always a difference between the current value and the setpoint. It is indeed possible to approach the setpoint by reducing the difference, however the system then often becomes unstable.

In order to improve such regulation, it is possible to introduce an additional correction for eliminating errors in tracking the setpoint. This correction is proportional to the time integral of the difference between the current value and the setpoint, i.e. proportional to the sum of all of the differences as measured continuously. This is known as proportional integral (PI) regulation.

Proportional integral derivative (PID) regulation also exists and includes an additional correction proportional to the derivative of the difference. This correction serves also to take account of variations in the difference, whether they are in direction and/or in amplitude.

PI regulation is frequently used on twin-engined aircraft, thus providing good control over the frequency of rotation of the main rotor and also over the performance of the aircraft. Operation is then balanced between the two engines of the power plant, thus making it possible in particular to have symmetrical wear of those engines and also in the mechanical connections constituting inlets to the MGB.

However, PI regulation requires complex connections between the computers of the two engines in order to ensure that each of the engines delivers equivalent power. In particular, such PI regulation requires the use of a balancing loop between the two computers.

In addition, the computers need to be relatively high performance computers in order to achieve such regulation. By way of example, such computers may be full authority digital engine control (FADEC) computers. The computers are often also twin-channel computer, i.e. the connections between the computers and also the connections between the computers and the engines are duplicated in order to make those connections secure, and consequently in order to make the operation of the power plant secure.

In addition, since the size of rotary wing aircraft is tending to increase, the need for power from their power plant is also tending to increase. Consequently, the power plants of such aircraft need to have at least three engines in order to be capable of delivering enough power.

Three-engined rotary wing aircraft are nowadays usually fitted with three engines that are identical, thereby making it possible in particular to ensure that the power plant is reactive in the event of one engine failing and also in order to simplify installing and integrating the engines.

Engines are said to be "identical" when they have identical characteristics for driving a rotary member.

Conversely, engines are said to be "unequal" when they have distinct drive characteristics, namely engines that generate different maximum powers and/or unequal maximum torques, and/or different maximum rotation frequencies of an outlet shaft. Thus, two unequal engines can correspond respectively to one engine driving an outlet shaft at several tens of thousands of revolutions per minute (rpm) and to another engine driving an outlet shaft at less than 10,000 rpm, for example.

For a power plant having three identical engines, the regulation of all three identical engines is identical, each engine delivering an equivalent level of power.

The use of such PI regulation with such a power plant nevertheless raises several problems. Firstly, it is necessary to use high performance computers such as computers of the FADEC type together with connections between each of the computers and each engine. The architecture of the connections between the computer then becomes complex, and the same applies to the regulation loop. This architecture is necessary in order to regulate the frequency of rotation of the main rotor in a manner that is simultaneously reactive, stable, and without static error. As a result, the balancing loop between those computers becomes complex and long.

Furthermore, since the computers may be twin-channel computers, the complexity of the connections between the computers becomes much greater. The weight of the electrical harnesses providing these connections can then be significant and installing them in the aircraft can also become complex. Consequently, the cost of such regulation for the at least three engines in such a power plant can become very high.

It is also possible to use proportional regulation for each engine. The architecture of the connections between the computers is then simpler, while still enabling the engines to be balanced. Nevertheless, static errors in the frequency of rotation of the main rotor of the aircraft are then frequent and the performance of the power plant and consequently of the aircraft is not fully under control and therefore not optimized.

It is also possible to use unequal engines in a three-engined power plant, e.g. in order to comply with safety requirements or in order to mitigate a lack of power from engines available on the market.

However, for a three-engined power plant having at least two unequal engines, regulating the engines can become even more complex, in particular in terms of sharing the power from each engine and regulating the frequency of rotation of the main rotor.

The technological background includes Document U.S. Pat. No. 4,479,619, which proposes a power transmission system for three-engined helicopters. Likewise, the Applicants' Super-Frelon helicopter also has three identical engines.

Document U.S. Pat. No. 3,963,372 proposes a solution for managing power and controlling engines in three-engined helicopters.

Document US 2003/0135305 describes a system for anticipating the torque drawn by the main rotor of a rotary wing aircraft, in particular in order to avoid a drop in the frequency of rotation of the main rotor.

Also known is Document U.S. Pat. No. 3,174,551, which describes a device capable of controlling and correcting unbalance between the powers delivered by two turboshaft engines of an aircraft.

Furthermore, Document U.S. Pat. No. 4,522,025 describes a system for managing the power and the frequency of rotation of the turboshaft engines of a rotary wing aircraft.

In order to mitigate the problem of engines that are designed so as to be overdimensioned, a power plant having engines with unequal maximum powers, for twin-engined aircraft, has already been proposed in the past. This applies to Document WO 2012/059671A2, which proposes two engines having unequal maximum powers. Nevertheless, that Document WO 2012/059671A2 relates only to twin-engined aircraft and does not present any solutions to problems associated with control or stability.

BRIEF SUMMARY OF THE INVENTION

An object of the present invention is to propose a three-engined power plant enabling the architectures between the computers of each of the engines to be simplified without thereby compromising control over the frequency of rotation of the main rotor of the aircraft, while also optimizing the power delivered by each engine.

The present invention makes it possible in particular to regulate the frequency of rotation of the rotor of the aircraft by using engine regulation schemes that may be different.

According to the invention, a power plant has two engine groups and a main gearbox (MGB). The two engine groups drive the MGB mechanically so as to rotate at least one main outlet shaft of the MGB, this main outlet shaft having a frequency of rotation NR.

This power plant is intended more particularly for a rotary wing aircraft, the MGB serving in particular to drive at least one main rotor of the aircraft via the main outlet shaft of the MGB.

The power plant is remarkable in that a first engine group has at least one main engine and a first regulator device. The first regulator device serves to regulate the operation of each main engine in compliance with a first setpoint NR* for the frequency of rotation NR of the main outlet shaft. The second engine group has at least one secondary engine and a second regulator device. The second regulator device serves to regulate the power delivered by each secondary engine in compliance with a second setpoint $W_1^*$ for the power to be delivered by the second engine group.

The power plant also has a third regulator device for regulating the operation of each main engine in compliance with a third setpoint $W_2f^*$ for anticipating the power to be delivered by the first engine group. This third setpoint $W_2f^*$ for anticipating power is such that the first engine group and the second engine group together deliver a necessary power $W_s^*$ needed at the main outlet shaft.

The third setpoint $W_2f^*$ does not serve to regulate directly the power delivered by the first engine group, since this group is regulated on a priority basis by the first setpoint NR* in order to control the frequency of rotation NR of the main outlet shaft from the power plant. However, the third setpoint $W_2f^*$ serves to improve the reactivity of the regulation of the first engine group, in particular during transient stages, by taking account of anticipated power needs from the first engine group and consequently of the power needed from the power plant.

Thus, the first engine group is regulated firstly in order to accurately control the frequency of rotation NR of the main outlet shaft of the power plant. This frequency of rotation NR of the main outlet shaft is then substantially equal to the first setpoint NR*, but may nevertheless vary a little about this first setpoint value NR* during regulation.

In addition, the first regulator device has as many main computers as there are main engines, each main computer being connected to a single main engine, the main computers being connected together in order to enable the main engines to be regulated. The first engine group generally includes at least two engines that may be identical or different. The first engine group preferably has two engines that are identical.

The first regulator device serves for example to regulate each main engine in application of a proportional integral (PI) loop.

In the particular circumstance of the power plant of the invention being applied to a rotary wing aircraft, the first regulator device acts as in a conventional power plant of a rotary wing aircraft to control accurately the frequency of rotation NR of the main rotor, which is driven by the main outlet shaft of the power plant. The first regulator device thus regulates the frequency of rotation of the free turbine of each main engine, each main engine preferably being a turboshaft engine controlled by a FADEC type main computer.

The second engine group is regulated by means of the second regulator device in order to deliver power $W_1$. For example, the power $W_1$ delivered by the second engine group is substantially equal to the second setpoint $W_1^*$, but may nevertheless vary a little around this second setpoint $W_1^*$ during regulation.

Furthermore, the second regulator device has as many secondary computers as there are secondary engines, each secondary computer being connected to a single secondary engine, the secondary computers being connected together in order to enable the secondary engines to be regulated. The second engine group preferably has a single secondary engine, which may be different from the main engines.

The second regulator device serves for example to regulate the power from each secondary engine by using a PI regulation loop. By way of example, the second regulator device performs this regulation in the manner described in Document FR 2 974 564.

In the particular circumstance of the power plant of the invention being applied to a rotary wing aircraft, each secondary engine is a turboshaft engine. The secondary regulator device then regulates the power from each secondary engine so as to comply with the second setpoint $W_1^*$ by means of a respective secondary computer for each secondary engine, each computer possibly being of the FADEC type.

The second regulator device may also regulate the second engine group with the help of a first limit indicator (FLI) when the power plant of the invention forms part of a rotary wing aircraft. The second setpoint $W_1^*$ for the power to be delivered by the second engine group may then be a function of information delivered by the first limit indicator (FLI) for the secondary engine.

The second regulator device preferably includes protection means for providing protection against overspeed of the main outlet shaft and against overspeed of each secondary engine. The term "overspeed of the main outlet shaft" is used to mean that the main outlet shaft has a frequency of rotation that is excessive and that might generate damage, in particular in the MGB of the power plant of the invention, and also in the aircraft when the power plant forms part of a rotary wing aircraft. Likewise, the term "overspeed of a secondary engine" means that the secondary engine has a frequency of rotation that is excessive and that might generate damage in the secondary engine.

If the second setpoint $W_1^*$ is too great, then the power $W_1$ delivered by the second engine group may be too great and may then generate such an overspeed. Under such circumstances, the power $W_1$ delivered by the second engine group should then be the second setpoint $W_1^*$ multiplied by a coefficient k, with this coefficient k being greater than zero and less than or equal to one.

The coefficient k is then equal to one so long as no overspeed is detected. The power $W_1$ actually delivered by the second engine group is then substantially equal to the second setpoint $W_1^*$, but may nevertheless vary a little around this second setpoint $W_1^*$ during regulation.

However, the coefficient k becomes less than one and greater than zero in the event of such overspeed being detected. The power $W_1$ actually delivered by the second engine group is then reduced and substantially equal to the value $k \cdot W_1^*$, i.e. in such a manner that $W_1 = k \cdot W_1^*$, but may nevertheless vary a little around this value $k \cdot W_1^*$ during regulation.

Finally, the first engine group delivers power $W_2$ so as to co-operate with the second engine group to deliver a necessary power $Ws^*$ that is needed at the main outlet shaft. This power $W_2$ delivered by the first engine group is then substantially equal to the third setpoint $W_2f^*$, but may nevertheless vary a little around this third setpoint value $W_2f^*$ during regulation.

The power $Ws^*$ needed at the main outlet shaft may be determined by calculation means, with the necessary power $Ws^*$ being shared between the first engine group and the second engine group. This necessary power $Ws^*$ is the sum of the second setpoint $W_1^*$ for power to be delivered by the second engine group plus a fourth setpoint $W_2^*$ for power to be delivered by the first engine group, such that $Ws^* = W_1^* + W_2^*$. The calculation means may be an element of the power plant of the invention. The calculation means may also be an element external to the power plant, and for example it may provide information specifying the power $Ws^*$ needed at the main outlet shaft.

Advantageously, the calculation means may include anticipation means for determining this power $Ws^*$ needed at the main outlet shaft. Thus, the necessary power $Ws^*$ is determined by taking account, by anticipation, of the needs for torque and/or power at the main outlet shaft.

By way of example, the anticipation means determine this necessary power $Ws^*$ by taking account of the first setpoint NR* for the frequency of rotation NR of the main outlet shaft and of the current frequency of rotation of the main outlet shaft and also of the acceleration or the deceleration of the main outlet shaft.

In the particular circumstance of a power plant forming part of a rotary wing aircraft, the anticipation calculation is performed depending on the performance needs of the aircraft, and in particular on the basis of information relating to the stage of flight and to the flight situations of the aircraft, and also as a function of flight commands issued by a pilot of the aircraft.

Furthermore, under such circumstances, the calculation means and the third regulator device may be incorporated directly in the avionics installation of the aircraft.

In addition, in the particular circumstance of a given stage of flight for the aircraft, and since the frequency of rotation NR of the main outlet shaft is regulated by the first engine group, the power $Ws^*$ needed for enabling the aircraft to fly is constant. The second and third regulator devices of the power plant of the invention then make it possible to adjust how this necessary power $Ws^*$ is shared between each of the engine groups.

The second regulator device and the third regulator device may also serve respectively to regulate the second engine group and the first engine group with the help of a first limit indicator (FLI). Such an instrument is present in particular in rotary wing aircraft. In addition, in the event of the second setpoint $W_1^*$ being constant, the use of a first limit indicator may be restricted to the main engines of the first group.

In a preferred embodiment of the invention, the first engine group has two main engines that are identical, while the second engine group has a single secondary engine, which may be different from the main engines. The secondary engine may be more powerful or less powerful than the main engines.

In a first variant of the invention, the third regulator device uses the second setpoint $W_1^*$ for determining the third setpoint $W_2f^*$. Thus, the second setpoint $W_1^*$ is subtracted from the power $Ws^*$ needed at the main outlet shaft in order to obtain this third setpoint $W_2f^*$. As a result, the third setpoint $W_2f^*$ is equal to the fourth setpoint $W_2^*$, such that $W_2f^* = W_2^*$, and consequently $W_2f^* = Ws^* - W_1^*$.

In a second variant of the invention, the third regulator device uses the power $W_1$ actually delivered by the second engine group to determine the third setpoint $W_2f^*$. Advantageously, this second variant serves to take account of the power $W_1$ actually delivered by the second engine group, possibly as reduced by the protection means. Thus, the power $W_1$ actually delivered by the second engine group is subtracted from the power $Ws^*$ needed at the main outlet shaft in order to obtain the third setpoint $W_2f^*$. As a result, this reduction in the power $W_1$ is taken into account and is compensated in the third setpoint $W_2f^*$. The third setpoint $W_2f^*$ may then be such that $W_2f^* = Ws^* - W_1$, or $W_2f^* = Ws^* - k \cdot W_1^*$.

It is also possible to write $W_2f^* = W_2^* + W_1^* \cdot (1-k)$, the third setpoint $W_2f^*$ being equal to the fourth setpoint $W_2^*$ plus the difference between the second setpoint $W_1^*$ for power and the power $W_1$ actually delivered by the second engine group. Thus, the total power delivered by the first engine group and by the second engine group is indeed equal to the power Ws* needed at the main outlet shaft.

Preferably, and in order to avoid injecting disturbances while taking account of the power $W_1$ actually delivered by the second engine group when preparing $W_2f^*$, the second regulator device includes at least one filter means. Each filter means serves in particular to limit or indeed to eliminate excitations generated by the resonant frequencies of the drive train relating to the power delivered by each secondary engine of the second engine group. Each filter means may be a lowpass filter in order to eliminate high frequencies. Each filter means may also be a frequency stop filter in order to eliminate only certain specific frequencies, such as frequencies of 2 hertz (Hz) or 3 Hz.

The third setpoint $W_2f^*$ is then such that $W_2f^*=W_2^*+H\cdot(W_1^*-W_1)$ or indeed $W_2f^*=W_2^*+H\cdot[W_1^*(1-k)]$, where $(W_1^*-W_1)$ is the reduction in the power $W_1$ to be taken into account in the third setpoint $W_2f^*$, and where $H\cdot(W_1^*-W_1)$ is this reduction as filtered by at least one filter means.

In addition, in the preferred embodiment of the invention, i.e. with the first engine group having n main engines that are identical, where n=2, this third setpoint $W_2f^*$ is shared equally between the two main engines. As a result, each main engine needs to deliver power $W_2f/n$, such that:

$$W_2f/n = \frac{W_2^* + H\cdot(W_1^* - W_1)}{2}$$

The second engine group is thus controlled in power only by the second setpoint $W_1^*$ generated by the second regulator device. In addition, since the first engine group is regulated so as to control the frequency of rotation NR of the main outlet shaft, the power delivered by each engine group may advantageously be optimized without degrading the performance of the power plant, and in particular by complying with the first setpoint NR* for the frequency of rotation NR of the main outlet shaft. The sharing of the necessary power Ws* between the two engine groups, i.e. between the second setpoint $W_1^*$ and the fourth setpoint $W_2^*$ for power may then be achieved by means of the calculation means using various operating criteria that it is desired to optimize for the power plant.

For example, the necessary power Ws* may be shared so as to optimize the specific consumption of each engine in each engine group. The specific fuel consumption of an engine is the weight of fuel consumed divided by the power delivered by the engine. This specific consumption serves in particular to quantify the energy efficiency of the engine relative to its power.

For certain engines, when the power delivered by that type of engine decreases, its specific consumption may increase. It is then advantageous to share the necessary power Ws* in such a manner that the specific consumptions of the main and secondary engines of the power plant are optimized, i.e. the overall consumption of fuel is as small as possible for a given mission.

In another example, the necessary power Ws* may be shared so as to optimize maintenance of each engine in each engine group. Any engine that is damaged while it is in use leads to maintenance time and cost that are proportional to that damage. Damage to an engine generally increases exponentially with the power it delivers, but in a manner that is specific to each engine. It is therefore advantageous to limit the power delivered by each engine in order to limit damage thereto. Furthermore, it is possible to define relationships for sharing power that make it possible to take account of the way in which each engine is damaged and thus optimize the time and the cost of maintaining each engine group.

Finally, the necessary power Ws* may be shared so as to optimize the performance of each engine in each engine group in the event of at least one of the engines failing. When an engine fails, the still-operational engine(s) should then be operated in a special mode known as one engine inoperative (OEI). This special mode allows each engine to develop higher levels of power with associated constraints on operating time.

In contrast, a longer or shorter length of time specific to each engine is required in order to reach the maximum level of power in this special OEI mode, and this length of time depends mainly on the current power being delivered by the engine and on its capacity for acceleration.

In order to optimize safety in the event of a failure of an engine in the power plant of the invention, it is then advantageous to minimize this time required by type remaining engines to reach this maximum power. The necessary power Ws* is then shared so as to minimize the time required by each engine for reaching its maximum power in the special OEI mode.

Furthermore, when each secondary engine is a turboshaft engine, the second setpoint $W_1^*$ for power may be transformed into a fifth setpoint $N_1^*$ for frequency of rotation $N_1$ of the gas generator of each secondary engine. Converter means enable this second setpoint $W_1^*$ for power to be converted into the fifth setpoint $N_1^*$. The converter means may be incorporated in the calculation means or in the secondary regulator device of the power plant.

The present invention also provides a rotary wing aircraft including at least one main rotor, an above-described power plant, and an avionics installation. The power plant drives the main rotor in rotation, which main rotor is constrained to rotate with the main outlet shaft of the MGB of the power plant. The aircraft may also include a tail rotor or indeed at least one propulsion propeller. The tail rotor or indeed each propulsion propeller may also be driven in rotation by the MGB via a secondary outlet shaft.

The third regulator device and the calculation means may also be situated in the avionics of the aircraft.

Likewise, the second regulator device may be situated in the avionics installation of the aircraft.

The present invention also provides a method of regulating a power plant for a rotary wing aircraft. The power plant comprises a first engine group, a second engine group, and a main gearbox (MGB), the two engine groups driving the MGB mechanically in order to rotate a main outlet shaft of the MGB. The main outlet shaft has a frequency of rotation NR and is constrained to rotate with a main rotor of the aircraft.

The method comprises the following steps:

determining a necessary power Ws* needed at the main outlet shaft and a first setpoint NR* for the frequency of rotation NR of the main outlet shaft;

determining a second setpoint $W_1^*$ for power for the second engine group;

regulating the first engine group having at least one main engine in application of the first setpoint NR* for the frequency of rotation NR;

regulating the power delivered by the second engine group having at least one secondary engine in application of the second setpoint $W_1^*$;

determining a third setpoint $W_2f^*$ for anticipating power for the first engine group; and regulating the operation of the first engine group in application of the third setpoint $W_2f^*$ for anticipated power such that the first engine group and the second engine group together deliver the necessary power $Ws^*$.

This third setpoint $W_2f^*$ does not enable the power delivered by the first engine group to be regulated directly since the first engine group is regulated on a priority basis by the first setpoint $NR^*$. However, this third setpoint $W_2f^*$ serves to improve the reactivity with which the first engine group is regulated by taking account in anticipation of the need for power of the first group.

It is also possible to correct the second setpoint $W_1^*$ for power by protection means for preventing overspeed of the main outlet shaft and/or of each secondary engine.

Likewise, since the second engine group actually delivers power $W_1$, it is possible to filter this power $W_1$ by at least one filter means, said third setpoint $W_2f^*$ then being such that $W_2f^* = W_2^* + H \cdot (W_1^* - W_1)$, where $(W_1^* - W_1)$ is the difference between the power $W_1$ and the second setpoint $W_1^*$, and where $H \cdot (W_1^* - W_1)$ is this reduction as filtered by said filter means.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE INVENTION

Figure 1:
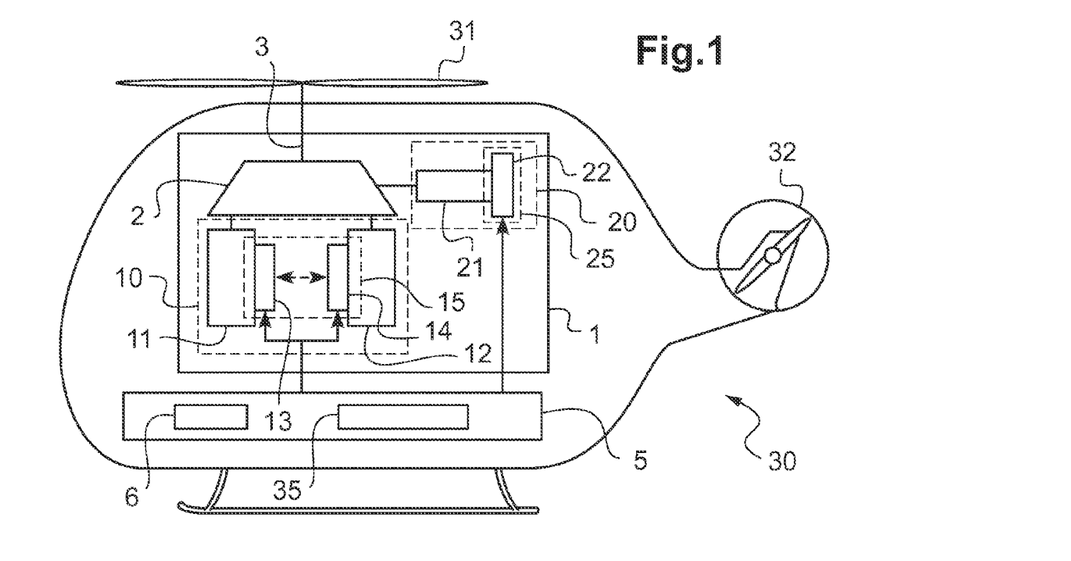
FIG. 1 shows a rotary wing aircraft having a power plant of the invention.

FIG. 1 shows a rotary wing aircraft 30 having a main rotor 31, a tail rotor 32, a power plant 1, and an avionics installation 5. The power plant 1 has a first engine group 10, a second engine group 20, and a main gearbox (MGB) 2. The two engine groups 10, 20 drive the MGB 2 mechanically in order to rotate a main outlet shaft 3 of the MGB 2. The main outlet shaft 3 is constrained to rotate with the main rotor 31 in order to provide the aircraft 30 with lift and possibly also propulsion.

The tail rotor 32 is also driven in rotation by the MGB 2 via a secondary outlet shaft from the MGB 2.

The first engine group 10 comprises two identical main engines 11 and 12 and a first regulator device 15. The first regulator device 15 comprises two main computers 13 and 14, each main computer 13, 14 being connected to a respective one of the main engines 11, 12, and the main computers 13, 14 are also connected to each other.

The second engine group 20 has a secondary engine 21 and a second regulator device 25. The second regulator device 25 has a secondary computer 22 connected to the secondary engine 21.

The main engines 11, 12 and the secondary engine 21, are all turboshaft engines, each comprising a gas generator and a free turbine driving the MGB 2.

The avionics installation 5 has a third regulator device 35 and calculation means 6.

Figure 2:
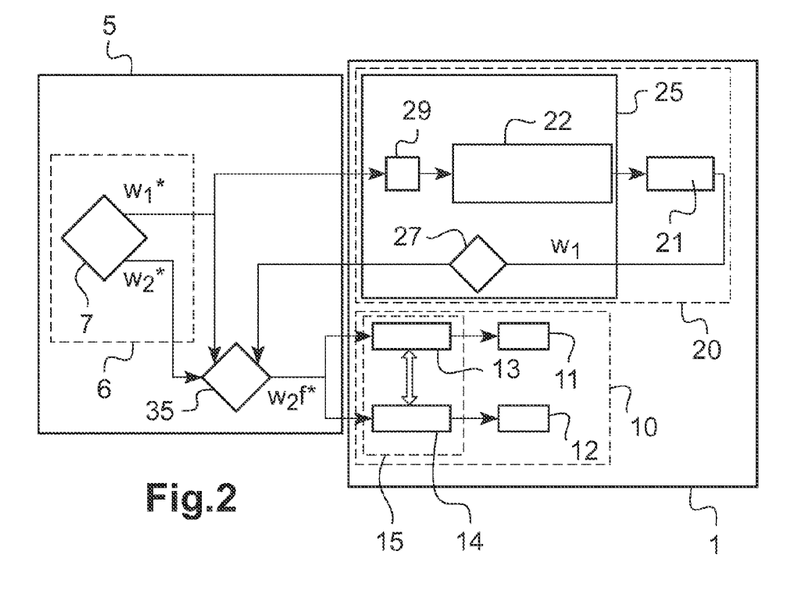
FIG. 2 shows the preferred embodiment of a power plant of the invention.
Figure 3:
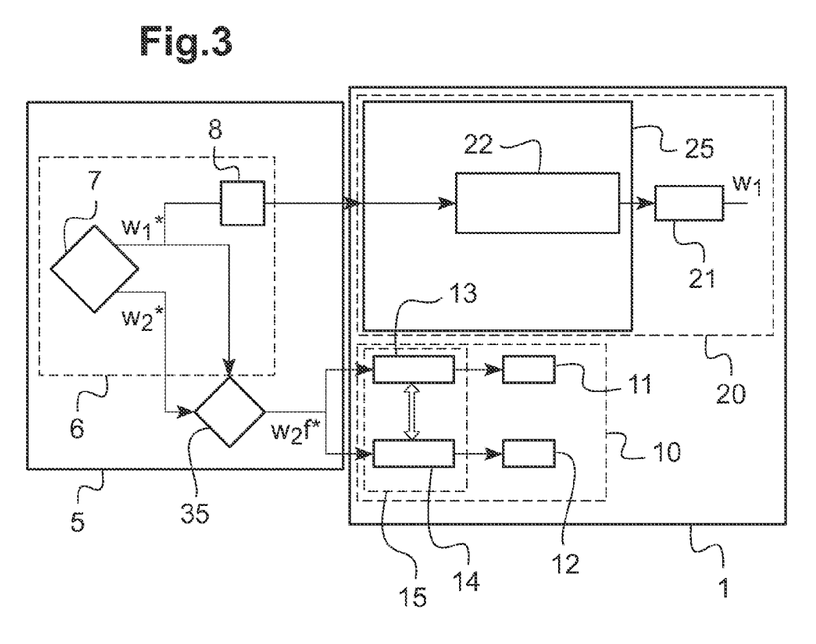
FIG. 3 shows another embodiment of a power plant of the invention.

FIGS. 2 and 3 show more precisely the power plant 1 in two embodiments, FIG. 2 showing the main embodiment of the power plant 1 of the invention.

The calculation means 6 serve to determine the necessary power $Ws^*$ needed by the main outlet shaft 3, and consequently by the main rotor 31. For this purpose, the calculation means 6 include anticipation means 7 in order to determine this power $Ws^*$ needed by the main outlet shaft 3 while taking account in particular of the torque and/or power requirements of the main outlet shaft 3 and of the main rotor 31 depending on flight commands executed by a pilot of the aircraft 30.

The first regulator device 15 serves to regulate the operation of the two main engines 11, 12 in application of a first setpoint $NR^*$ for the frequency of rotation $NR$ of the main outlet shaft 3 and of the main rotor 31.

By way of example, the first regulator device 15 serves to regulate the two main engines 11, 12 using a proportional integral (PI) regulation loop. If these two engines 11, 12 are identical, they then operate symmetrically, with each main engine 11, 12 contributing equally to driving the main rotor 31 via the main outlet shaft 3.

Thus, by means of the first regulator device 15, the first engine group 10 serves to control the frequency of rotation $NR$ of the main outlet shaft 3 and of the main rotor 31, with this frequency of rotation $NR$ being substantially equal to the first setpoint $NR^*$.

The second regulator device 25 serves to regulate the power delivered by the secondary engine 21 constituting the second engine group 20 in application of a second setpoint $W_1^*$ specifying the power to be delivered by the second engine group 20.

This second regulator device 25 includes protection means for providing protection against overspeed of the main outlet shaft 3, and consequently of the main rotor 31, and against overspeed of the secondary engine 21. The second regulator device thus multiplies the second setpoint $W_1^*$ by a coefficient k, where the coefficient k is greater than zero and less than or equal to 1.

When no overspeed is detected, the coefficient k is equal to one. In contrast, if such overspeed is detected, the coefficient k is less than one and greater than zero. Under all circumstances, the power $W_1$ actually delivered by the second engine group 20 is then substantially equal to the value $k \cdot W_1^*$, but may nevertheless vary a little about this value $k \cdot W_1^*$ during regulation, while the coefficient k is greater than zero and less than or equal to one.

The second regulator device 25 regulates the secondary engine 21 by applying a proportional integral (PI) regulation loop.

The third regulator device 35 serves to regulate the operation of the two main engines 11, 12 in application of a third setpoint $W_2f^*$ anticipating the power that needs to be delivered by the first engine group 10. The first engine group 10 then delivers power $W_2$ substantially equal to this third setpoint $W_2f^*$, but that may nevertheless vary a little around this third setpoint $W_2f^*$ during regulation.

This third setpoint $W_2f^*$ does not enable the power delivered by the first engine group 10 to be regulated directly, since this group is regulated by the first setpoint $NR^*$. However, this third setpoint $W_2f^*$ serves to improve the reactivity with which the first engine group is regulated by taking account in anticipation of the power that is to be needed from this first engine group 10.

This third setpoint $W_2f^*$ concerning anticipated power is such that the first engine group 10 and the second engine group 20 together deliver the power Ws* needed by the main outlet shaft 3.

The necessary power Ws* needed by the main outlet shaft 3 and determined by the calculation means 6 is shared between the first engine group 10 and the second engine group 20. This necessary power Ws* is the sum of the second power setpoint $W_1^*$ plus a fourth power setpoint $W_2^*$, such that $Ws^*=W_1^*+W_2^*$.

When no overspeed is detected by the protection means 29, the coefficient k is equal to one. Consequently, the power $W_1$ actually delivered by the second engine group 20 is then substantially equal to the second setpoint $W_1^*$. Consequently, the third setpoint $W_2f^*$ is equal to the fourth setpoint $W_2^*$ such that $W_2f^*=W_2^*$, and consequently $W_2f^*=Ws^*-W_1^*$.

However, in the event of such overspeed being detected, the coefficient k is less than one and greater than zero. Consequently, the power $W_1$ actually delivered by the second engine group 20 is then substantially equal to the value $k \cdot W_1^*$. Consequently, the third setpoint $W_2f^*$ is equal to the fourth setpoint $W_2^*$ plus the difference between the second setpoint $W_1^*$ and the power $W_1$ actually delivered, such that $W_2f^*=W_2^*+(W_1^*-W_1)$. It can thus be deduced that the second setpoint $W_2f^*=Ws^*-W_1$, i.e. $W_2f^*=Ws^*-k \cdot W_1^*$.

The total power delivered by the power plant 1 is thus indeed equal to the power Ws* needed by the main outlet shaft 3 and the main rotor 31.

Furthermore, the second regulator device 25 includes filter means 27 to avoid injecting disturbances into the third regulator means 35. The filter means 27 serve to limit or indeed eliminate excitations generated by the resonant frequencies of a drive train relating to the power $W_1$ delivered by the secondary engine 21. These filter means 27 may be a lowpass filter or a frequency stop filter.

The third setpoint $W_2f^*$ is then such that $W_2f^*=W_2^*+H \cdot (W_1^*-W_1)$ or $W_2f^*=W_2^*+H \cdot [W_1^*(1-k)]$, where $H \cdot (W_1^*-W_1)$ is the difference between the power $W_1$ and the second setpoint $W_1^*$ as filtered by the filter means 27.

In addition, since the two main engines 11, 12 are identical, this third setpoint $W_2f^*$ is shared equally between the two main engines 11, 12. As a result, each main engine 11, 12 needs to deliver power $W_2f/n$, where n=2 in this example, such that:

$$W_2f/n = \frac{W_2^* + H \cdot (W_1^* - W_1)}{2}$$

Furthermore, the sharing of the necessary power Ws* between the two engine groups 10 and 20, i.e. between the second setpoint $W_1^*$ and the fourth setpoint may be achieved by the calculation means 6 in application of various operating criteria of the power plant 1.

For example, the sharing of the necessary power Ws* may be determined so as to optimize the specific consumption of the two main engines 11, 12 and of the secondary engine 21, i.e. so that the sum of the specific consumptions of the main and second engines 11, 12 and 21 is as low as possible.

In another example, the sharing of the necessary power Ws* may be determined so as to optimize the maintenance of each of the engines 11, 12, 21 of the power plant 1.

Finally, the sharing of the necessary power Ws* may be determined so as to optimize the performance of each engine 11, 12, 21 of the power plant 1 in the event of at least one of the engines 11, 12, 21 failing, e.g. by minimizing the time needed by each engine 11, 12, 21 to reach its maximum power in the special OEI mode.

FIG. 3 shows another embodiment of the power plant 1 of the invention.

In this embodiment, the third regulator device 35 uses the second setpoint $W_1^*$ to determine the third setpoint $W_2f^*$. Thus, the second setpoint $W_1^*$ is subtracted from the necessary power Ws* needed at the main outlet shaft 3 in order to obtain this third setpoint $W_2f^*$. As a result, the third setpoint $W_2f^*$ is equal to the fourth setpoint $W_2^*$ such that $W_2f^*=W_2^*$, and consequently $W_2f^*=Ws^*-W_1^*$.

The calculation means 6 include conversion means 8 for transforming the second power setpoint $W_1^*$ into a fifth setpoint $N_1^*$. The second regulator means 25 thus serve to regulate the frequency of rotation $N_1$ of the gas generator of the secondary engine 21 in application of this fifth setpoint $N_1^*$. This frequency of rotation $N_1$ of the gas generator of the secondary engine 21 is then substantially equal to this fifth setpoint $N_1^*$, but may nevertheless vary a little around this fifth setpoint $N_1^*$.

Naturally, the present invention may be subjected to numerous variations as to its implementation. Although several embodiments are described above, it will readily be understood that is not conceivable to identify exhaustively all possible embodiments. It is naturally possible to envisage replacing any of the means described by equivalent means without going beyond the ambit of the present invention.

What is claimed is:

1. A power plant comprising two engine groups and a main gearbox (MGB), the two engine groups driving the MGB mechanically in order to rotate a main outlet shaft of the MGB, the main outlet shaft having a frequency of rotation NR, wherein a first engine group comprises at least one main engine and a first regulator device, the first regulator device regulating operation of each main engine in application of a first setpoint NR* for the frequency of rotation NR of the main outlet shaft, and in that a second engine group comprises at least one secondary engine and a second regulator device, the second regulator device regulating power delivered by each secondary engine in application of a second setpoint $W_1^*$ for the power to be delivered from the second engine group, the power plant having a third regulator device regulating operation of the first engine group in application of a third setpoint $W_2f^*$ for anticipating power to be delivered by the first engine group such that the first engine group and the second engine group together provide a necessary power Ws* needed at the main outlet shaft.

2. The power plant according to claim 1, wherein the second regulator device includes at least one filter.

3. The power plant according to claim 2, wherein the third setpoint $W_2f^*$ for anticipating power is such that $W_2f^*=W_2^*+H \cdot (W_1^*-W_1)$, $(W_1^*-W_1)$ being a difference between the power $W_1$, actually delivered by the second engine group and the second setpoint $W_1^*$, and where $H \cdot (W_1^*-W_1)$ is a difference filtered by the at least one filter.

4. The power plant according to claim 1, wherein the first engine group comprises two identical main engines.

5. The power plant according to claim 1, wherein the second setpoint $W_1^*$ for power is determined so as to optimize specific consumption of each engine of each of the engine groups.

6. The power plant according to claim 1, wherein the second setpoint $W_1^*$ for power is determined in order to optimize maintenance of each engine of each of the engine groups.

7. The power plant according to claim 1, wherein the second setpoint $W_1^*$ for power is determined so as to optimize performance of each engine of each of the engine groups if at least one of the engines fails.

8. The power plant according to claim 1, wherein the first regulator device includes at least one main computer, each main computer being connected to a single main engine, and the second regulator device includes at least one secondary computer, each secondary computer being connected to a single secondary engine.

9. The power plant according to claim 1, wherein each secondary engine is a turboshaft engine provided having a gas generator, and the second setpoint $W_1^*$ for power is transformed into a fifth setpoint $N_1^*$ for the frequency of rotation of the gas generator, the second regulator device being configured to transform the second setpoint $W_1^*$ for power into the fifth setpoint $N_1^*$ for frequency of rotation of the gas generator.

10. The power plant according to claim 1, wherein the at least one main engine of the first engine group is two main engines and the at least one secondary engine of the second engine group is one secondary engine.

11. A power plant comprising two engine groups and a main gearbox (MGB) and a calculator for determining a necessary power Ws* needed at a main outlet shaft of the MGB, the two engine groups driving the MGB mechanically in order to rotate the main outlet shaft of the MGB, the main outlet shaft having a frequency of rotation NR, wherein a first engine group comprises at least one main engine and a first regulator device, the first regulator device regulating operation of each main engine in application of a first setpoint NR* for the frequency of rotation NR of the main outlet shaft, and in that a second engine group comprises at least one secondary engine and a second regulator device, the second regulator device regulating power delivered by each secondary engine in application of a second setpoint $W_1^*$ for the power to be delivered from the second engine group, the power plant having a third regulator device regulating operation of the first engine group in application of a third setpoint $W_2f^*$ for anticipating power to be delivered by the first engine group such that the first engine group and the second engine group together provide the necessary power Ws* needed at the main outlet shaft, wherein the calculator for determining the necessary power Ws* needed at the main outlet shaft of the MGB is configured to determine the necessary power Ws* needed at the main outlet shaft by anticipation of needs for torque and/or power at the main outlet shaft.

12. A method of regulating a power plant for a rotary wing aircraft, the power plant comprising a first engine group, a second engine group, and a main gearbox (MGB), the first and second engine groups driving the MGB mechanically in order to rotate a main outlet shaft of the MGB, the main outlet shaft having a frequency of rotation NR and being constrained to rotate with a main rotor of the aircraft, the method comprising the following steps:

determining a necessary power Ws* needed at the main outlet shaft and a first setpoint NR* for the frequency of rotation NR of the main outlet shaft;

determining a second setpoint $W_1^*$ for power to be delivered by the second engine group;

regulating the first engine group having at least one main engine in application of the first setpoint NR* for the frequency of rotation NR;

regulating the power delivered by the second engine group having at least one secondary engine in application of the second setpoint $W_1^*$ for power;

determining a third setpoint $W_2f^*$ for anticipating power to be delivered by the first engine group; and regulating the operation of the first engine group in application of the third setpoint $W_2f^*$ for anticipated power such that the first engine group and the second engine group together deliver the necessary power Ws*.

13. The method according to claim 12 for regulating a power plant, wherein power $W_1$ actually delivered by the second engine group is filtered by at least one filter, the third setpoint $W_2f^*$ for anticipating power being such that $W_2f^* = W_2^* + H \cdot (W_1^* - W_1)$, where $(W_1^* - W_1)$ being a difference between the power $W_1$ actually delivered by the second engine group and the second setpoint $W_1^*$ and where $H \cdot (W_1^* - W_1)$ is a difference filtered by at least one filter.

* * * * *